United States Patent [19]

Hirsch et al.

[11] Patent Number: 4,801,354
[45] Date of Patent: Jan. 31, 1989

[54] AQUEOUS PIGMENT SUSPENSIONS BASED ON ALKYL (METH) ACRYLATES AS DISPERSANTS FOR PIGMENTS

[75] Inventors: Guenter Hirsch, Mutterstadt; Werner Auhorn, Frankenthal, both of Fed. Rep. of Germany

[73] Assignee: BASF Aktiengesellschaft, Ludwigshafen, Fed. Rep. of Germany

[21] Appl. No.: 38,986

[22] Filed: Apr. 16, 1987

Related U.S. Application Data

[62] Division of Ser. No. 833,251, Feb. 26, 1986.

[30] Foreign Application Priority Data

Mar. 12, 1985 [DE] Fed. Rep. of Germany ....... 3508704

[51] Int. Cl.$^4$ .......................... D21H 3/44; D21H 3/98
[52] U.S. Cl. ............................. 162/168.1; 162/181.1; 162/183
[58] Field of Search ................. 524/560, 427, 431; 106/306, 308 M; 162/168.1, 168.7, 181.1, 181.2, 181.3, 181.4, 181.5, 183

[56] References Cited

U.S. PATENT DOCUMENTS

| | | | |
|---|---|---|---|
| 3,840,487 | 10/1974 | Dyson et al. | 260/29.6 H |
| 4,115,187 | 9/1978 | Davidson | 162/181.3 |
| 4,279,661 | 7/1981 | Strauch et al. | 106/288 B |
| 4,284,546 | 8/1981 | Delfosse et al. | 427/358 |

*Primary Examiner*—Peter Chin
*Attorney, Agent, or Firm*—Oblon, Fisher, Spivak, McClelland & Maier

[57] ABSTRACT

Aqueous pigment suspensions which are added to the stock suspension during papermaking and contain, as a dispersant, from 0.1 to 2% by weight, based on the pigment, of a copolymer which contains, as copolymerized units, (a) from 40 to 95% by weight of an ester of (meth)acrylic acid with a saturated monohydric $C_1$–$C_8$-alcohol or with a saturated dihydric $C_2$–$C_4$-alcohol and (b) from 60 to 5% by weight of an ethylenically unsaturated $C_3$–$C_5$-carboxylic acid and has a K value of from 10 to 65 (determined according to H. Fikentscher in 1% aqueous solution in the form of the ammonium salt at pH 9 and at 20° C.), their preparation and their use.

6 Claims, No Drawings

AQUEOUS PIGMENT SUSPENSIONS BASED ON ALKYL (METH) ACRYLATES AS DISPERSANTS FOR PIGMENTS

This is a division of application Ser. No. 833,252, filed Feb. 26, 1986, now abandoned.

Concentrated aqueous pigment suspensions are required in large amounts in industry for the preparation of paper-coating mixtures. In order to produce highly concentrated aqueous pigment suspensions, finely milled pigments are dispersed in water in the presence of from 0.1 to 2% by weight, based on pigments, of a dispersant. Low molecular weight polymers of acrylic acid, which are prepared, for example, by the process described in European Patent No. 27,771, are particularly effective dispersants. Furthermore, according to German Laid-Open Application DOS No. 3,123,732, copolymers of acrylic acid and an acrylamidopropanesulfonic acid are used for the preparation of highly concentrated aqueous pigment suspensions. U.S. Pat. No. 3,840,487, moreover, discloses that copolymers which contain from 40 to 95 mol % of an ethylenically unsaturated carboxylic acid, such as acrylic acid or methacrylic acid, and from 5 to 60 mol % of an ester of an ethylenically unsaturated carboxylic acid, eg. methyl acrylate, as copolymerized units are dispersants for pigments. The pigment suspensions prepared in this manner contain the pigments in a finely divided state, have a lower viscosity than dispersant-free suspensions and are used exclusively for the preparation of paper-coating mixtures.

However, aqueous pigment suspensions prepared using the dispersants described above are unsuitable for the preparation of filler-containing papers in which such aqueous pigment suspensions are added to the paper stock and the sheet is then formed on the paper machine from the stock treated in this manner, because even the small amounts of dispersants interfere to a very considerable extent with the drainage of the paper stock and the efficiency of the retention aids during papermaking.

It is an object of the present invention to provide aqueous pigment suspensions and a dispersant for pigments, which are added to the stock suspension during papermaking.

We have found that this object is achieved, according to the invention, by using copolymers which contain as copolymerized units
(a) from 40 to 95% by weight of an ester of acrylic acid or methacrylic acid and a saturated monohydric $C_1$-$C_8$-alcohol or a saturated dihydric $C_2$-$C_4$-alcohol and
(b) from 60 to 5% by weight of an ethylenically unsaturated $C_3$-$C_5$-carboxylic acid,
and have a K value of from 10 to 65 (determined according to H. Fikentscher in 1% strength aqueous solution as the ammonium salt at pH 9 and at 20° C.) as dispersants for pigments which are added to the stock suspension during papermaking. The copolymers are preferably employed in a form partially or completely neutralized with an alkali metal hydroxide solution, ammonia or an amine.

Copolymers of the composition stated above are known. The contain, as component (a), from 40 to 95, preferably from 65 to 90, % by weight of an ester of acrylic acid or methacrylic acid with a saturated monohydric $C_1$-$C_8$-alcohol or with a saturated dihydric $C_2$-$C_4$-alcohol. Examples of suitable esters are methyl acrylate, ethyl acrylate, n-propyl acrylate, isopropyl acrylate, n-butyl acrylate, isobutyl acrylate, tert-butyl acrylate, n-pentyl acrylate, neopentyl acrylate, n-hexyl acrylate, cyclohexyl acrylate, 2-ethylhexyl acrylate, methyl methacrylate, ethyl methacrylate, propyl methacrylate, n-, iso- and tert-butyl methacrylate, neopentyl methacrylate, 2-ethylhexyl methacrylate, 2-hydroxyethyl acrylate, 2-hydroxyethyl methacrylate, 2-hydroxypropyl acrylate, 3-hydroxypropyl acrylate, 4-hydroxybutyl acrylate, 4-hydroxybutyl methacrylate, 2- and 3-hydroxypropyl methacrylate and 2-hydroxyethyl methacrylate. It is of course also possible to use mixtures of different acrylates as component a), as well as mixtures of different methacrylates and mixtures of acrylates and methacrylates. Esters of acrylic acid and methacrylic acid derived from isomeric alcohols, for examples of n-propyl acrylate and isopropyl acrylate, can also be used. The copolymers preferably contain, as component (a), n-butyl acrylate or isobutyl acrylate or mixtures of the two isomeric butyl acrylates as copolymerized units.

The copolymers contain, as component (b), from 60 to 5, preferably from 35 to 10, % by weight of an ethylenically unsaturated $C_3$-$C_5$-carboxylic acid as copolymerized units. Examples of suitable ethylenically unsaturated acids are acrylic acid, methacrylic acid, maleic acid, fumaric acid, crotonic acid and itaconic acid, and maleic anhydride is also suitable and can be converted to the acid or salt form after being incorporated as polymerized units. From this group of monomers, acrylic acid is preferably used for the preparation of the copolymers.

The copolymers are prepared by subjecting the monomers (a) and (b) to copolymerization, for example in aqueous solution in the presence of polymerization initiators and polymerization regulators. Preferred polymerization regulators are thio compounds, these being used in an amount of from 0.5 to 12% by weight, based on the monomers.

Examples of suitable thio compounds are thioglycolic acid, dodecylmercaptan and 2-mercaptoethanol. Hydroxylamine and its salts, eg. hydroxylammonium chloride, and alcohols can also be used as polymerization regulators. The monomers (a) and (b) are preferably subjected to solution copolymerization in an alcohol at from 50° to 200° C. in the presence of a polymerization initiator. Examples of alcohols suitable for the solution polymerization are methanol, ethanol, n-propanol and isopropanol. The copolymerization of acrylic acid and n- or isobutyl acrylate is preferably carried out in isopropanol as the solvent. After the polymerization, it is preferable to neutralize some or all of the carboxyl groups of the copolymer. If the polymerization is carried out in an organic solvent, this solvent is removed from the reaction mixture before the neutralization step and is reused for a further polymerization. The distillation residue is then neutralized with an alkali metal hydroxide solution, eg. sodium hydroxide solution or potassium hydroxide solution, ammonia or an amine, eg. ethylamine, ethanolamine, trimethylamine or morpholine. The degree of neutralization of the copolymers is preferably from 60 to 100%. If the polymerization is carried out in an aqueous medium, the resulting copolymer is neutralized directly in the form obtained in the copolymerization, using one of the above bases or a mixture of these.

This procedure gives copolymers which have a K value of from 10 to 65 (determined according to H. Fikentscher in 1% strength aqueous solution in the form of the ammonium salt at pH 9 and at 20° C.). The K value of the copolymers is preferably from 15 to 35.

The copolymers thus prepared are used as dispersants for pigments which are added to the stock suspension during papermaking. To date, the pigments have been introduced directly into the stock suspension when making filler-containing papers. However, it is more advantageous to disperse the pigments beforehand with a dispersant and then to incorporate them into the stock suspension, since this results in the pigments being dispersed more finely in the paper and hence also gives papers possessing better optical properties. When the copolymers are used as dispersants for pigments, an aqueous pigment suspension is first prepared; this suspension contains from 40 to 80% by weight of a pigment in which from 40 to 90% of the particles have a diameter of <2 μm and from 0.1 to 2% by weight, based on the pigment, of copolymer which contains, as copolymerized units, (a) from 40 to 95% by weight of an ester of acrylic acid or methacrylic acid with a saturated monohydric $C_1$–$C_8$-alcohol or with a saturated dihydric $C_2$–$C_4$-alcohol and
(b) from 60 to 5% by weight of an ethylenically unsaturated $C_3$–$C_5$-carboxylic acid and has a K value of from 10 to 65 (determined according to H. Fikentscher in 1% aqueous solution in the form of the ammonium salt at pH 9 and at 20° C.) and may be partially or completely neutralized with an alkali metal hydroxide solution, ammonia or an amine. The pigment suspensions preferably contain from 0.2 to 0.7% by weight, based on pigment, of copolymer of the components (a) and (b). They are prepared, for example, by a method in which the copolymer, preferably one which has been completely neutralized with ammonia, is first dissolved in water, and the pigment is added to the stirred solution. The pigment suspensions in the stated concentration ranges are capable of being pumped and can therefore be added to the paper stock in a simple manner.

The copolymers of the components (a) and (b) differ from other polymers used as dispersants in particular in that neither the drainage nor the action of retention aids conventionally used in papermaking is adversely affected. Moreover, there is no adverse effect on paper sizing, as is found when conventional dispersants are present. This is a great advantage in papermaking, since the production rate is not adversely affected and the amount of retention aids required is not increased.

When the copolymers of the components (a) and (b) are used for dispersing pigments for coating paper, these copolymers, although not as effective as the polyacrylic acids conventionally used for this purpose and disclosed in, for example, European Patent No. 2,771, do have the great advantage that coated paper rejects, which are always encountered in paper coating, can also be reused for papermaking, without adversely affecting the drainage rate or the action of the retention aids.

The copolymers of the components (a) and (b) are used for dispersing clay, calcium carbonate (lime, chalk or precipitated chalk), talc, bentonite and titanium dioxide. The pigments may be both filler pigments and coating pigments. In the pigments, from 40 to 90% of the particles have a diameter of <2 μm. The pigment suspensions are prepared at room temperature in a conventional apparatus, for example in a deliteur, a dissolver or a caddy mill. The temperature of the pigment suspension may increase somewhat during preparation owing to the effect of high shear forces during dispersing. The aqueous pigment suspension is then added to the paper stock, prior to sheet formation, in an amount such that the papers produced contain from 2 to 50, preferably from 5 to 30, % by weight of pigments.

Testing of the paper sheets for the Examples described below was carried out after the sheets had been conditioned for 24 hours at 23° C. and a relative humidity of 50%.

The acceleration of the drainage procedure was determined from the increase in freeness in degrees SR (Schopper-Riegler) according to data sheet 107 of the Verein der Zellstoff- und Papierchemiker und Ingenieure. The drainage time was measured with the aid of a Rapid-Köthen apparatus.

In the Examples, parts and percentages are by weight. The viscosities were measured in a Brookfield-type rotational viscometer at a speed of 100 min$^{-1}$ and at 20° C.

EXAMPLE 1

The following 52% strength aqueous chalk suspensions were first prepared from a finely divided chalk in which 70% of the particles had a diameter of <2 μm:

(a) Comparison

Finely divided chalk was stirred into water without the use of a dispersant. An aqueous suspension having a pH of 9.0 and a viscosity of 2350 mPa.s was obtained.

(b) Comparison

A commercial dispersant (sodium salt of a homopolymer of acrylic acid, having a K value of 24 at pH 9.0) was first dissolved in water, after which the above finely divided chalk was added to give a 52% aqueous chalk suspension which contained 0.2%, based on chalk, of the dispersant. This chalk suspension had a viscosity of 85 mPa.s at pH 9.0.

(c) Example according to the invention

The ammonium salt of a solution copolymer of 80% by weight of a mixture of n- and isobutyl acrylate in a weight ratio of 1:1 and 20% by weight of acrylic acid (K value 24 at pH 9.0) was dissolved in water, after which finely divided chalk was added to give a 52% strength aqueous chalk suspension which contained 0.2%, based on pigment, of the copolymer. The suspension had a pH of 9.0 and a viscosity of 260 mPa.s.

Three 0.5% strength stock suspensions in water were then prepared from pure pine sulfite pulp, and one of the chalk suspensions (a) to (c) described above was added to each of the suspensions so that in each case a pigment content of 40%, based on dry fiber, was obtained. The resulting stock suspensions (a) to (c) each had a pH of 7.5 and a Schopper-Riegler freeness of from 54 to 55.

Each stock suspension was then divided into three parts, and its behavior with regard to sheet formation was tested in a Rapid-Köhen laboratory sheet former. The first part of the stock suspension was used directly for sheet formation, while 0.2% and 0.4% of a commercial cationic retention aid was added to the second and third parts, respectively. The retention aid was a condensation product of adipic acid and diethylenetriamine, grafted with ethyleneimine and then crosslinked with a polyalkylene oxide whose terminal OH groups had been reacted with equivalent amounts of epichlorohydrin, according to Example 1 of German Patent No.

2,434,816. The results obtained are summarized in Table 1.

TABLE 1

| Stock sus- pension | Drainage time [sec] | | | Freeness [SR] | | | Basis weight [g/m²] | | |
|---|---|---|---|---|---|---|---|---|---|
| | after the addition of ... % of a commercial retention aid | | | | | | | | |
| | 0 | 0.2% | 0.4% | 0 | 0.2% | 0.4% | 0 | 0.2% | 0.4% |
| (a) | 80 | 51.5 | 43.6 | 55 | 43 | 39 | 58.3 | 65.8 | 66.9 |
| (b) | 79.6 | 72.2 | 67.6 | 55 | 52 | 50 | 57.5 | 60.4 | 63.2 |
| (c) | 75.2 | 51.2 | 43.7 | 54 | 44 | 40 | 60.3 | 66.2 | 69.2 |

As shown in Table 1, the presence of the commercial polyacrylic acid as a dispersant interferes to a very great extent with the drainage and the retention process for stock suspension (b), in comparison with the dispersant-free suspension (a). For example, the drainage time is increased, the freeness is less greatly increased and the basis weight is reduced. On the other hand, when stock suspension (c) is used, no such interference is observed.

EXAMPLE 2

A 0.5% strength aqueous stock suspension is first prepared from 80% of groundwood and 20% of bleached sulfate pulp, and the said suspension is then divided into three parts, each of which was mixed with the aqueous chalk suspensions (a) to (c) described in Example 1, so that the resulting pigment content was 40%, based on dry fiber. The pH of the stock suspensions 2(a) to 2(c) thus obtained was 7.0. These stock suspensions were then divided into three parts, one part being tested directly and the other two parts being tested after the addition of 0.08 and 0.16%, respectively, of a commercial cationic retention aid. The retention aid used was a water-in-oil emulsion of a copolymer of 70% of acrylamide and 30% of diethylaminoethyl acrylate. The results are shown in Table 2. In this case too, it is clear that the copolymer used according to the invention does not interfere with the drainage of the paper stock whereas the commercial dispersant has a very adverse effect.

TABLE 2

| Stock suspension | Drainage time [sec] Basis weight [g/m²] after the addition of ... % of a commercial retention aid | | | | | |
|---|---|---|---|---|---|---|
| | 0 | 0.08 | 0.16 | 0 | 0.08 | 0.16 |
| (a) Comparison | 99 | 45.5 | 34.3 | 61.7 | 73.1 | 77.16 |
| (b) Comparison | 98.4 | 56.3 | 42.3 | 60.8 | 71.3 | 73.9 |
| (c) According to the invention | 93.5 | 46.3 | 34.5 | 61.4 | 73.9 | 77.3 |

EXAMPLE 3

Three 52% strength suspensions having a pH of 7 were prepared by dispersing clay in water. In the clay, 45% of the particles had a size of <2 μm.

(a) Comparison

A 52% strength clay suspension in water was prepared, the suspension having a viscosity of 4150 mPa.s.

(b) Comparison

A 52% strength aqueous clay suspension was prepared using 0.2% of the polyacrylic acid described in Example 1(b). A clay suspension having a viscosity of 40 mPa.s. was obtained.

(c) Example according to the invention

A clay suspension having a viscosity of 1400 mPa.s was prepared using, as a dispersant, 0.2%, based on pigment, of a solution copolymer of 80% of isobutyl acrylate and 20% of acrylic acid, the copolymer being prepared in isopropanol and having a K value of 23.

A 0.5% strength stock suspension was then prepared from pure pine sulfite pulp, the suspension containing 1% of alum and having a pH of 5. This suspension was divided into three parts, and the pigment suspensions described above under (a) to (c) were added to each of the parts so that the pigment content of the resulting stock suspensions was 40%, based on dry fiber. The three different stock suspensions (a) to (c) thus obtained were divided into three parts, one of these parts being tested without any further additives while the second part was tested after the addition of 0.2% of a retention aid and the third part after the addition of 0.4% of a retention aid, the tests being carried out in a Rapid-Köthen laboratory sheet former. The retention aid used was the commercial product described in Example 1. The results, which are given in Table 3, show that the copolymer used according to the invention (stock suspension (c)) does not interfere with the drainage and retention, whereas the commercial dispersant (stock suspension (b)) results in poorer retention.

TABLE 3

| Stock suspension | Drainage time [sec] Basis weight [g/m²] after the addition of ... % of a commercial retention aid | | | | | |
|---|---|---|---|---|---|---|
| | 0 | 0.2 | 0.4 | 0 | 0.2 | 0.4 |
| (a) | 86.4 | 61.4 | 53.7 | 64.8 | 67.0 | 69.1 |
| (b) | 88.3 | 65.6 | 59.4 | 65.5 | 65.3 | 68.4 |
| (c) | 83.3 | 60.2 | 50.4 | 63.1 | 67.0 | 70.3 |

We claim:

1. A process for the preparation of a paper containing from 2 to 50% by weight of a pigment, which comprises adding an aqueous pigment suspension to paper stock prior to sheet formation,
   wherein said aqueous pigment suspension contains from 40 to 80% by weight of a pigment in which from 40 to 90% of the particles thereof have a diameter of less than two microns and, as a disperant, from 0.1 to 2% by weight, based on the pigment, of a copolymer which contains, as copolymerized units,
   (a) from 40 to 95% by weight of an ester of acrylic acid or methacrylic acid with a saturated monohydric $C_1$-$C_8$-alcohol or with a saturated dihydric $C_2$-$C_4$-alcohol, and
   (b) from 60 to 5% by weight of an ethylenically unsaturated $C_3$-$C_5$-carboxylic acid,
   and wherein said copolymer has a K value of from 10 to 65, determined according to the method of H. Fikentscher in 1% strength aqueous solution in the form of an ammonium salt at pH 9 and at 20° C. and wherein the pH of the stock is from 7.0 to 7.5.

2. A process as claimed in claim 1, wherein the copolymer is used in the form partially or completely neutralized with an alkali metal hydroxide solution, ammonia or an amine.

3. A process as claimed in claim 1, wherein the copolymer used contains, as copolymerized units,
   (a) from 65 to 90% by weight of an ester of acrylic acid or methacrylic acid with a saturated monohydric $C_1$-$C_8$-alcohol or with a saturated dihydric $C_2$-$C_4$-alcohol and
   (b) from 40 to 10% by weight of an ethlylenically unsaturated $C_3$-$C_5$-carboxylic acid and
has a K value of from 15 to 35.

4. A process as claimed in claim 1, wherein the copolymer used contains, as copolymerized units,
  (a) from 65 to 10% by weight of an ester of acrylic acid with a saturated monohydric $C_4$-alcohol and
  (b) from 35 to 10% by weight of acrylic acid, methacrylic acid, maleic acid or fumaric acid
and has a K value of from 15 to 35.

5. A process as claimed in claim 1, wherein an ammonium salt of a copoylmer which contains, as copoylmerized units
  (a) from 65 to 90% by weight of a butyl acrylate and
  (b) from 35 to 10% by weight of acrylic acid or methacrylic acid
and has a K value of from 15 to 35 is used.

6. A process as claimed in claim 1, wherein an ammonium salt of a copolymer which is prepared by solution polymerization of the monomers (a) and (b) at from 50° to 200 °C. in the presence of polymerization initiators and polymerization regulators, evaporation of the solvent and neutralization with ammonia is used.

* * * * *